United States Patent
Song

(10) Patent No.: US 10,175,524 B2
(45) Date of Patent: Jan. 8, 2019

(54) METHOD OF FABRICATING COLOR FILTER, COLOR FILTER, DISPLAY PANEL, AND DISPLAY

(71) Applicant: Shenzhen China Star Optoelectronics Technology Co., Ltd., Shenzhen, Guangdong (CN)

(72) Inventor: Jiangjiang Song, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 290 days.

(21) Appl. No.: 15/102,791

(22) PCT Filed: May 6, 2016

(86) PCT No.: PCT/CN2016/081277
§ 371 (c)(1),
(2) Date: Jun. 8, 2016

(87) PCT Pub. No.: WO2017/121052
PCT Pub. Date: Jul. 20, 2017

(65) Prior Publication Data
US 2018/0039132 A1   Feb. 8, 2018

(30) Foreign Application Priority Data
Jan. 13, 2016   (CN) .......................... 2016 1 0021936

(51) Int. Cl.
*G02F 1/1335*   (2006.01)
*G02B 5/22*   (2006.01)
(Continued)

(52) U.S. Cl.
CPC ....... *G02F 1/133516* (2013.01); *G02B 5/201* (2013.01); *G02B 5/22* (2013.01);
(Continued)

(58) Field of Classification Search
CPC ................................................. G02F 1/133516
See application file for complete search history.

(56) References Cited

U.S. PATENT DOCUMENTS

| | | | | |
|---|---|---|---|---|
| 4,776,671 A | * | 10/1988 | Sumi | G02B 5/223 349/106 |
| 5,399,374 A | * | 3/1995 | Sumi | G02F 1/133512 359/890 |
| 5,808,719 A | * | 9/1998 | Fujiwara | G02F 1/13336 349/106 |

FOREIGN PATENT DOCUMENTS

| CN | 1534346 A | 10/2004 |
|---|---|---|
| CN | 103698832 A | 4/2014 |

(Continued)

*Primary Examiner* — Kendrick Hsu
(74) *Attorney, Agent, or Firm* — Andrew C. Cheng

(57) ABSTRACT

The present disclosure proposes a method of fabricating a color filter. The method includes: forming a permeable film on a glass substrate and drying the permeable film; and covering a black mask with a first hollow area, a red mask with a second hollow area, a green mask with a third hollow area, and a blue mask with a fourth hollow area on the dried permeable film successively, and only one of the four masks being covered each time; putting the permeable film covered by the masks into a particle solution corresponding to a respective color successively for forming the color filter comprising a black shielding area, a red area, a green area, and a blue area. The color filter is fabricated in a simpler manufacturing process. The thickness of the black shielding area of the color filter is accordance to the thickness of the RGB primary color area.

5 Claims, 6 Drawing Sheets

(51) Int. Cl.
*G02B 5/20* (2006.01)
*G02F 1/1362* (2006.01)
(52) U.S. Cl.
CPC .......... *G02B 5/223* (2013.01); *G02F 1/1335* (2013.01); *G02F 1/133512* (2013.01); *G02F 2001/13625* (2013.01)

(56) References Cited

FOREIGN PATENT DOCUMENTS

| | | |
|---|---|---|
| CN | 105467664 A | 4/2016 |
| EP | 0182914 A1 | 6/1986 |
| JP | S55166607 A | 12/1980 |
| JP | H01229205 A | 9/1989 |
| JP | H05100112 A | 4/1993 |

\* cited by examiner

METHOD OF FABRICATING COLOR FILTER, COLOR FILTER, DISPLAY PANEL, AND DISPLAY

CROSS REFERENCE

This application is claims the benefit and priority of Chinese Application No. 201610021936.1, entitled "Method of fabricating color filter, color filter, display Panel, and display", filed on Jan. 13, 2016, the disclosure of which is incorporated herein by reference in its entirety.

FIELD OF THE INVENTION

The present invention relates to a method of fabrication, and more particularly, to a method of fabricating a color filter, a color filter from the method, and a method of fabricating the color filter.

BACKGROUND OF THE INVENTION

A color filter is a crucial component for some devices such as an LCD, which is capable of showing colorful images. The color filter is an optical filter, which is used to show colors. The color filter exactly filters a desired small wave range of optical waves and reflects or absorbs undesired wave ranges of optical waves. A conventional color filter comprises a black shielding area and a red, green, and blue (RGB) area (i.e., a primary color area). The black shielding area is used for blocking light off. The RGB primary color area comprises a red area, a green area, and a blue area. Every three areas form a pixel. One or more than one of the three areas is/are selected to display the colors of the area through light so that the three areas can be mixed to form the corresponding colors. Usually, the process of fabricating the conventional color filter is as follows: photoresist coating-→pre-baking→exposing→developing→post-baking. Based on the process, the black shielding area and the RGB primary color area are successively formed. This process is more sophisticated and spends more time. Besides, the RGB primary color area is thicker than the black shielding area for the color filter fabricated based on the process, which may cause a problem that the color filter and other layers in the LCD panel are disharmonious in the subsequent process of lamination.

SUMMARY OF THE INVENTION

An object of the present invention is to propose a method of fabricating a color filter, a color filter, a display panel, and a display. The color filter is fabricated in a simpler manufacturing process. The thickness of the black shielding area of the color filter is accordance to the thickness of a RGB primary color area. The problem existing in the conventional technology is avoided.

According to the present invention, a method of fabricating a color filter, comprises steps: forming a permeable film on a glass substrate and drying the permeable film; and covering a black mask with a first hollow area, a red mask with a second hollow area, a green mask with a third hollow area, and a blue mask with a fourth hollow area on the dried permeable film successively, and only one of the four masks being covered each time; putting the permeable film covered by the masks into a particle solution corresponding to a respective color successively for forming the color filter comprising a black shielding area, a red area, a green area, and a blue area.

In one aspect of the present invention, the step of forming the permeable film on the glass substrate and drying the permeable film comprises: forming a macromolecular permeable film filled with a plurality of holes on the glass substrate by means of affix, and drying the permeable film.

In another aspect of the present invention, the step of forming the permeable film on the glass substrate and drying the permeable film comprises: coating a macromolecular osmotic material filled with a plurality of holes on the glass substrate, forming the permeable film on the glass substrate, and drying the permeable film.

In another aspect of the present invention, the step of covering only one of the black mask with the first hollow area, the red mask with the second hollow area, the green mask with the third hollow area, and the blue mask with the fourth hollow area on the dried permeable film successively and putting the permeable film covered by the masks into the particle solution corresponding to the respective color successively for forming the color filter comprising the black shielding area, the red area, the green area, and the blue area comprises: pasting the black mask having the first hollow area on the dried permeable film, and putting the glass substrate having the black mask into a carbon black particle solution for forming the black shielding area and a marked area on the permeable film; removing the black mask, pasting the red mask having the second hollow area on the permeable film based on the marked area, and putting the glass substrate having the permeable film having the red mask into a red particle solution for forming the red area; removing the red mask, pasting the green mask having the third hollow area on the permeable film based on the marked area, and putting the glass substrate having the permeable film having the green mask into a green particle solution for forming the green area; and removing the green mask, pasting the blue mask having the fourth hollow area on the permeable film based on the marked area, and putting the glass substrate having the permeable film having the blue mask into a blue particle solution for forming the blue area, thereby forming the color filter comprising the red area, the green area, the blue area, and the black shielding area.

In still another aspect of the present invention, the marked area is a rectangular frame, and the red mask, the green mask, and the blue mask are pasted on the permeable film by aligning an edge of a frame of the marked area.

In yet another aspect of the present invention, the hollow area in the black mask is arranged in advance of the black shielding area and the marked area which need to be formed in the color filter; the hollow area in the red mask is arranged in advance of the red area which needs to be formed in the color filter; the hollow area in the green mask is arranged in advance of the green area which needs to be formed in the color filter; the hollow area in the blue mask is arranged in advance of the blue area which needs to be formed in the color filter.

According to the present invention, a color filter comprises a glass substrate, and a permeable film, formed on the glass substrate. Relative areas formed on the permeable film absorb black particles, red particles, green particles, and blue particles for forming a black shielding area, a red area, a green area, and a blue area.

In one aspect of the present invention, the red area, the green area, the blue area, and the black shielding area are shaped like stripes, and the red area, the black shielding area, the green area, the black shielding area, the blue area, and the black shielding area are arranged from left to right in a loop in the color filter.

According to the present invention, a display panel comprises a color filter. The color filter comprises a glass substrate, and a permeable film, formed on the glass substrate. Relative areas formed on the permeable film absorb black particles, red particles, green particles, and blue particles for forming a black shielding area, a red area, a green area, and a blue area.

In one aspect of the present invention, the red area, the green area, the blue area, and the black shielding area are shaped like stripes, and the red area, the black shielding area, the green area, the black shielding area, the blue area, and the black shielding area are arranged from left to right in a loop in the color filter.

The present invention proposes the method of fabricating the color filter, the color filter, the display panel, and the display. The color filter is fabricated in a simpler manufacturing process. The thickness of the black shielding area of the color filter is accordance to the thickness of the RGB primary color area.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. Specifically, the terminologies in the embodiments of the present invention are merely for describing the purpose of the certain embodiment, but not to limit the invention.

Figure 1:
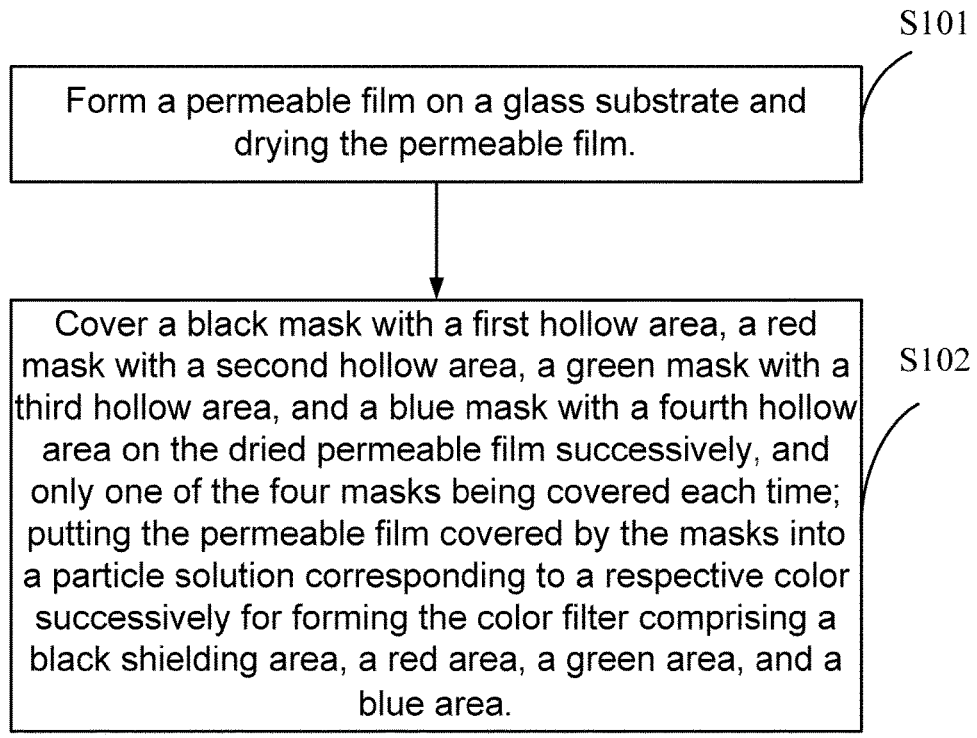
FIG. 1 is a flowchart of a method of fabricating a color filter 100 according to an embodiment of the present invention.
Figure 2:
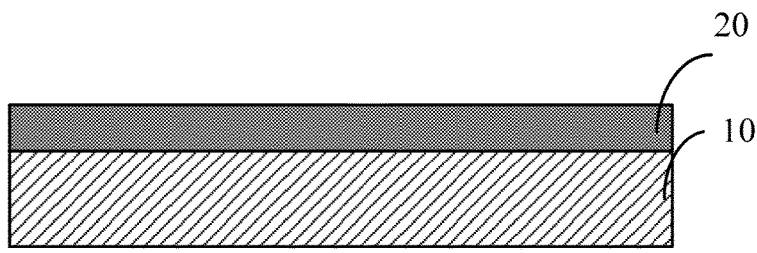
FIG. 2 shows a permeable film forming on a glass substrate according to the embodiment of the present invention.

Please refer to FIG. 1 and FIG. 2. FIG. 1 is a flowchart of a method of fabricating a color filter 100 according to the present invention. At first, a permeable film 20 is formed and dried on a glass substrate 10 (Step S101), as FIG. 2 shows. The permeable film 20 is a macromolecular permeable film filled with a plurality of holes. The permeable film 20 is formed on the glass substrate 10 by means of affix. In other embodiments, a macromolecular osmotic material filled with a plurality of holes is coated on the glass substrate 10 to form the permeable film 20 on the glass substrate 10. The permeable film 20 is formed on the whole surface of the glass substrate 10.

Figure 4:
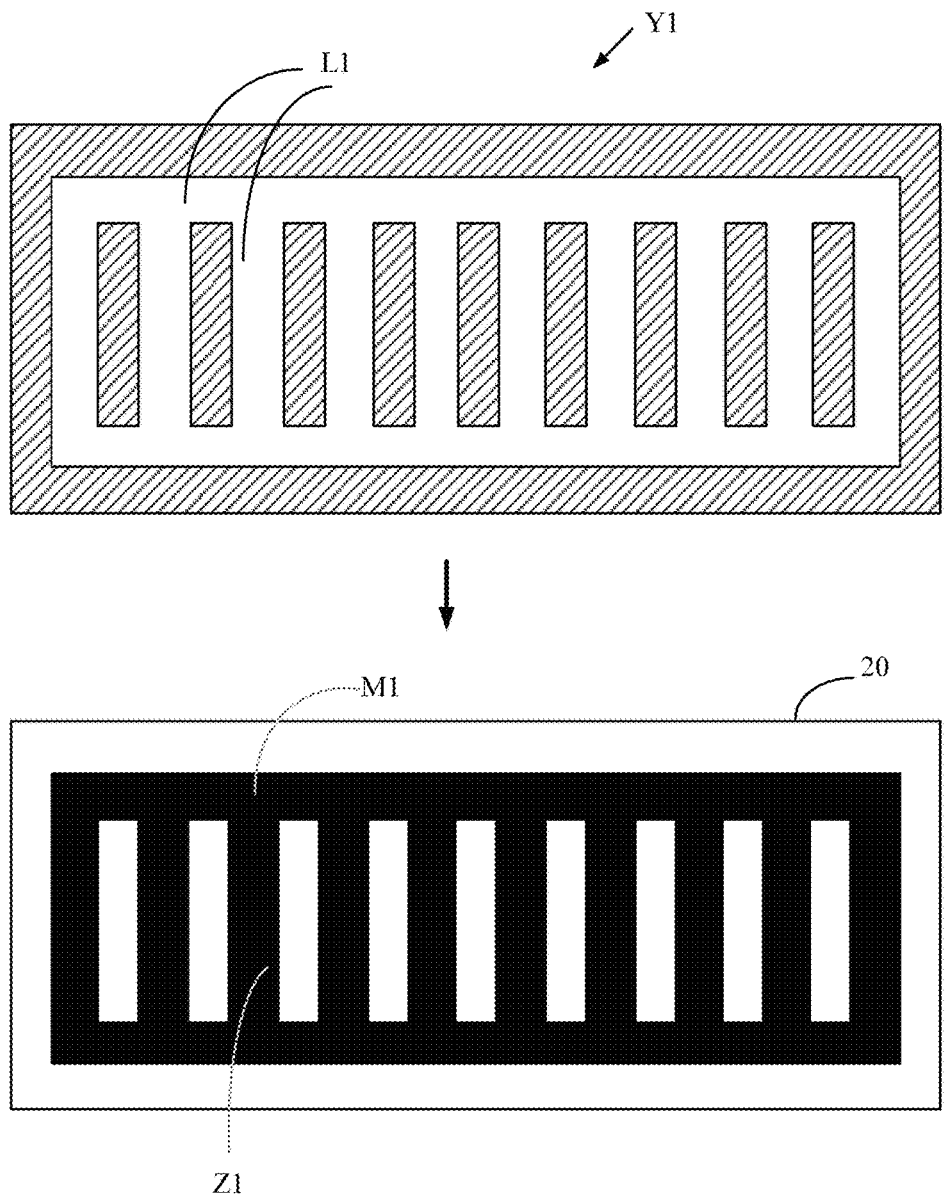
FIGS. 4-7 show a process of forming the color filter according to a preferred embodiment of the present invention.
Figure 5:
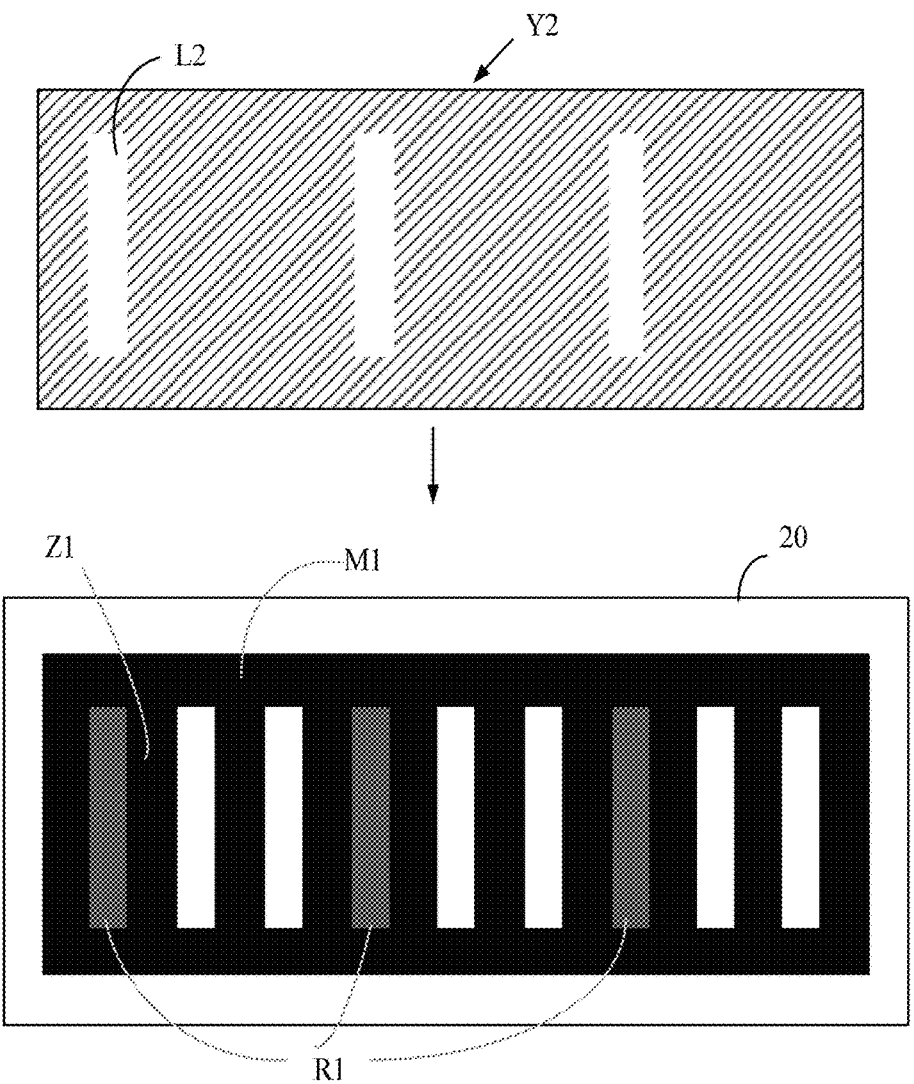
Figure 6:
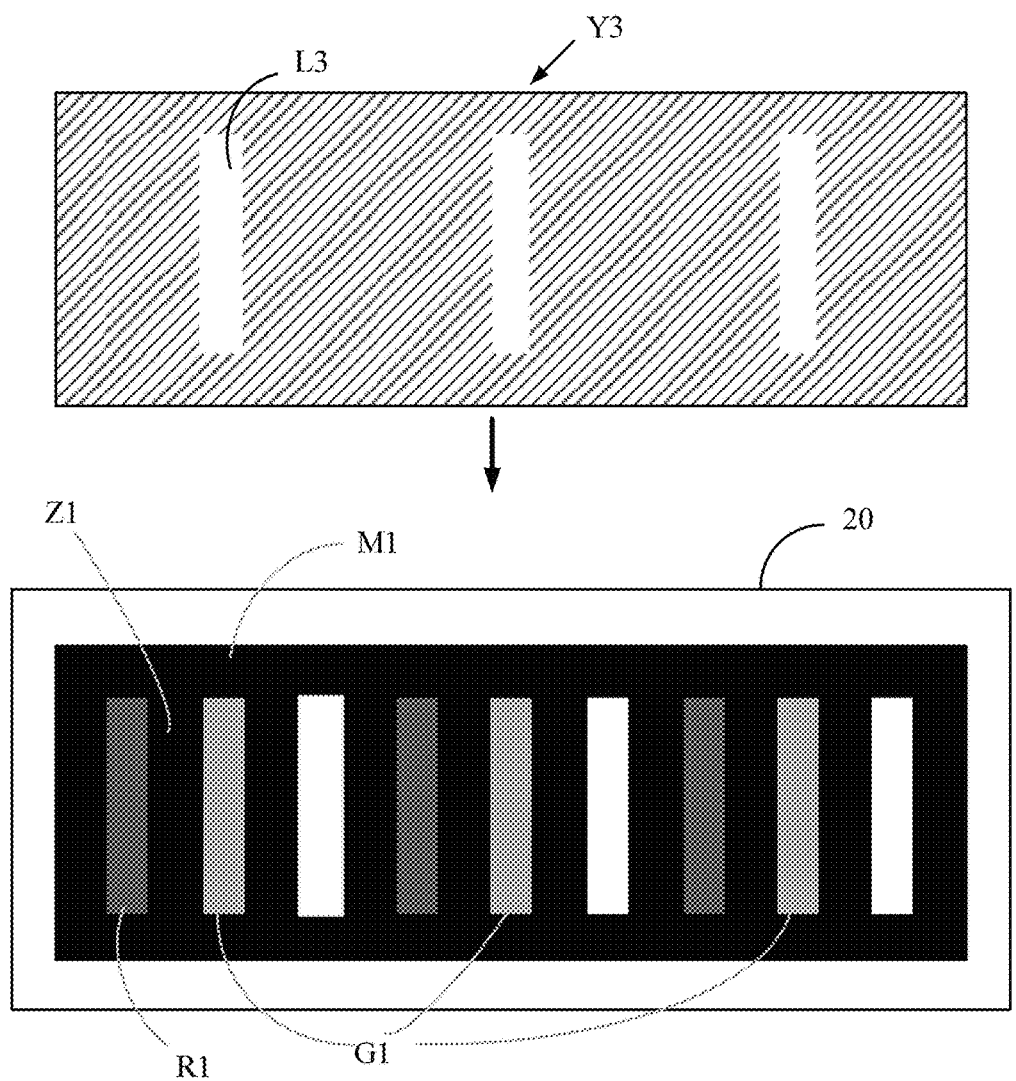
Figure 7:
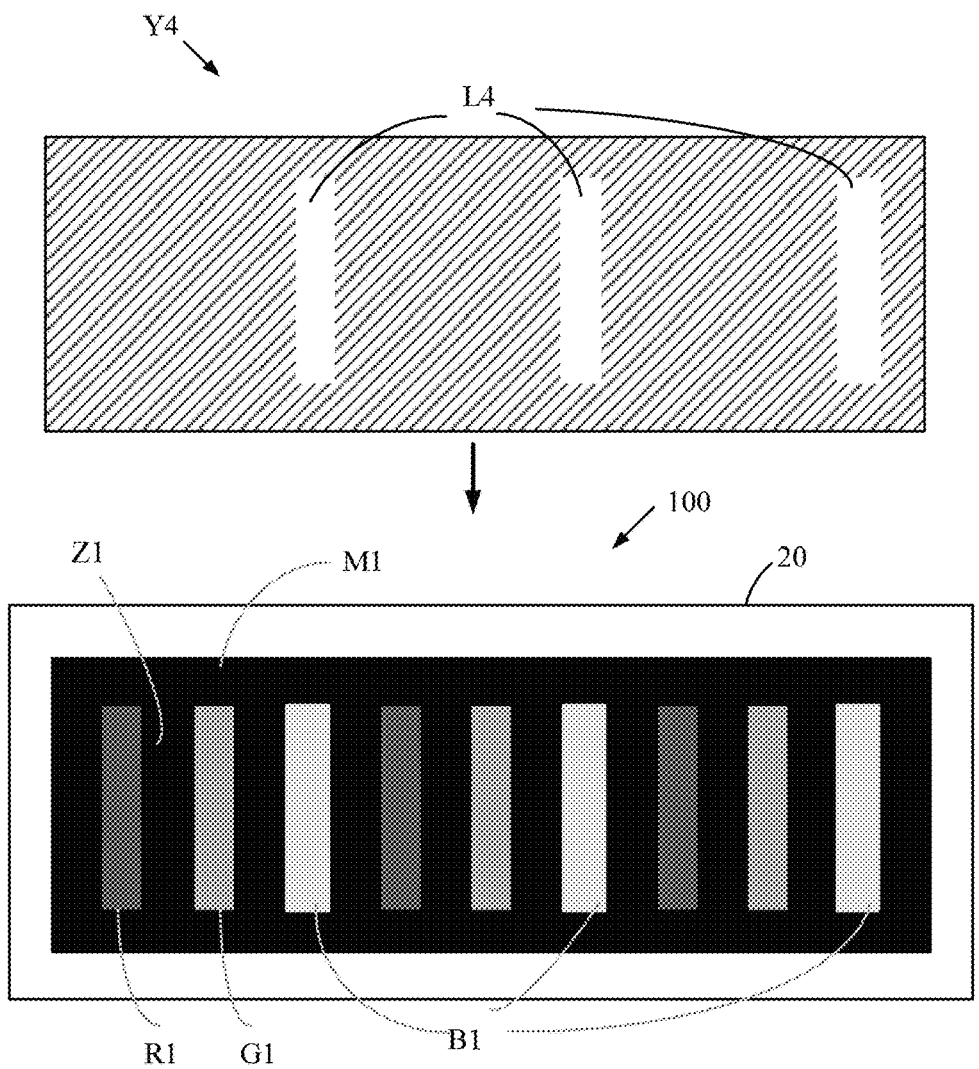

Subsequently, on the dried permeable film 20, a black mask Y1 with a hollow area L1 (as FIG. 4 shows), a red mask Y2 with a hollow area L2 (as FIG. 5 shows), a green mask Y3 with a hollow area L3 (as FIG. 6 shows), and a blue mask Y4 with a hollow area L4 (as FIG. 7 shows) are covered successively. Only one of the four masks is covered each time. Besides, the permeable film 20 covered by the masks is put into a particle solution corresponding to a respective color successively to form the color filter 100 comprising a black shielding area Z1, a red area R1, a green area G1, and a blue area B1 (as FIG. 7 shows) (Step S102).

Figure 3:
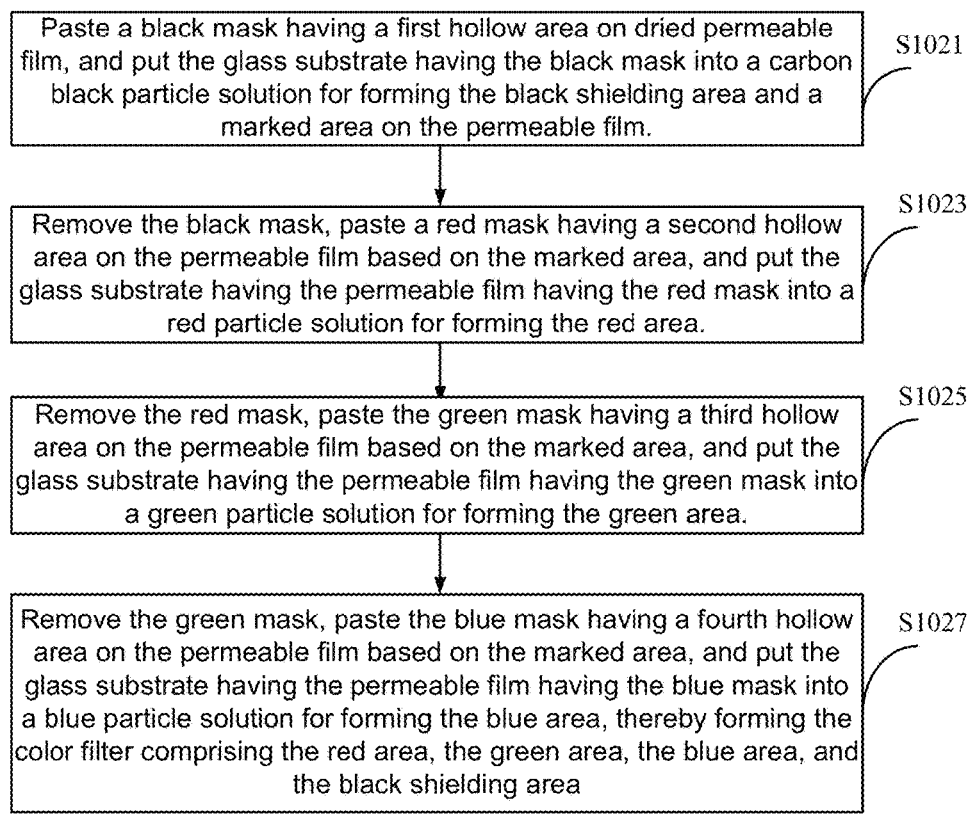
FIG. 3 is a flowchart of a sub-step according to one preferred embodiment of the present invention.

Please refer to FIG. 3 to FIG. 7. FIG. 3 is a flowchart of Step S102 according to one preferred embodiment of the present invention. Paste the black mask Y1 having the hollow area L1 on the dried permeable film 20, as FIG. 4 shows; put the glass substrate 10 having the black mask Y1 into a carbon black particle solution to form the black shielding area Z1 and marked area M1 on the permeable film 20, as FIG. 3 shows (Step S1021). The black mask Y1 is hollowed to form the hollow area L1 on a location where the black shielding area Z1 and the marked area M1 need to be formed. Since the hollow area L1 in the black mask Y1 is not covered, a black pattern is formed on the hollow area L1 after the dried permeable film 20 absorbs the carbon black particle solution. So the opaque black pattern forms the black shielding area Z1 and the marked area M1. The hollow area L1 in the black mask Y1 is arranged in advance of the black shielding area Z1 and the marked area M1 which need to be formed in the color filter 100. A hollow location which the marked area M1 corresponds to has a rectangular frame with a certain width in this embodiment.

Remove the black mask Y1; paste the red mask Y2 having the hollow area L2 on the glass substrate 10 based on the marked area M1, as FIG. 5 shows; put the glass substrate 10 having the permeable film 20 having the red mask Y2 into a red particle solution to form the red area R1 (Step S1023). The size of the red area R1 is the same as the frame of the marked area M1. The red mask Y2 aligning the edge of the frame of the marked area M1 is pasted on the glass substrate 10, which is put into the red particle solution. Since the hollow area L2 in the red mask Y2 is not covered, a red pattern is formed on the hollow area L2 after the dried permeable film 20 absorbs the red particle solution. So the red pattern forms the red area R1. The hollow area L2 in the red mask Y2 is arranged in advance of the red area R1 which needs to be formed in the color filter 100.

Remove the red mask Y2; paste the green mask Y3 having the hollow area L3 on the glass substrate 10 based on the marked area M1, as FIG. 6 shows; put the glass substrate 10 having the permeable film 20 having the green mask Y3 into a green particle solution to form the green area G1 (Step S1025). The size of the green mask Y3 is the same as the frame of the marked area M1. The green mask Y3 aligning the edge of the frame of the marked area M1 is pasted on the glass substrate 10, which is put into the green particle solution. Since the hollow area L3 in the green mask Y3 is not covered, a green pattern is formed on the hollow area L3 after the dried permeable film 20 absorbs the green particle solution. So the green pattern forms the green area G1. The hollow area L3 in the green mask Y3 is arranged in advance of the green area G1 which needs to be formed in the color filter 100.

Remove the green mask Y3; paste the blue mask Y4 having the hollow area L4 on the glass substrate 10 based on the marked area M1, as FIG. 7 shows; put the glass substrate 10 having the permeable film 20 having the blue mask Y4 into a blue particle solution to form the blue area B1, thereby forming the color filter 100 comprising the red area R1, the green area G1, the blue area B1, and the black shielding area Z1 (Step S1027). The size of the blue mask Y4 is the same as the frame of the marked area M1. The blue mask Y4 aligning the edge of the frame of the marked area M1 is pasted on the glass substrate 10, which is put into the blue solution. Since the hollow area L4 in the blue mask Y4 is not covered, a blue pattern is formed on the hollow area L4 after the dried permeable film 20 absorbs the blue particle solution. So the blue pattern forms the blue area B1. The hollow area L4 in the blue mask Y4 is arranged in advance of the blue area B1 which needs to be formed in the color filter 100.

As FIG. 3 shows, the method of forming the black shielding area Z1, the red area R1, the green area G1, and the blue area B1 specifically is merely one preferred embodiment of the present invention. The order of the black shielding area Z1, the red area R1, the green area G1, and the blue area B1 can be rearranged in other embodiments. For example, at first, the red area R1 and the marked area M1 are formed on the permeable film 20 through the red mask Y2. Next, the black shielding area Z1 is formed after the permeable film 20 is covered by the black mask Y1 and put into the carbon black particle solution. Subsequently, the blue area B1 is formed after the permeable film 20 is covered by the blue mask Y4 and put into the blue particle solution. Afterwards, the green area G1 is formed after the permeable film 20 is covered by the green mask Y3 and put into the green particle solution. However, the size of a first mask as the marked area M1 needs to be in accordance with the size of the glass substrate 10. The size of the following masks needs to match the frame of the marked area M1.

The black mask Y1, the red mask Y2, the green mask Y3, the blue mask Y4 are metallic masks in the corresponding hollow areas. The metallic plate is laid on all the non-hollow areas.

The black shielding area Z1, the red area R1, the green area G1, and the blue area B1 are formed on the color filter 100 after the dry permeable film 20 absorbs the corresponding color particles. So the black shielding area Z1, the red area R1, the green area G1, and the blue area B1 are formed by dyeing the permeable film 20 on different locations directly. So the thickness is the same.

Therefore, the color filter 100 comprises the glass substrate 10 and the permeable film 20. The relative areas formed on the glass substrate 10 absorb the black particles, the red particles, the green particles, and the blue particles to form the permeable film 20 comprising the black shielding area Z1, the red area R1, the green area G1, and the blue area B1. As FIG. 7 shows, the red area R1, the green area G1, the blue area B1, and the black shielding area Z1 are shaped like stripes in this embodiment. In the finally formed color filter 100, the red area R1, the black shielding area Z1, the green area G1, the black shielding area Z1, the blue area B1, and the black shielding area Z1 are arranged from left to right in a loop. It is possible that the red area R1, the green area G1, the blue area B1, and the black shielding area Z1 are shaped otherwise in other embodiments. It is also possible that the red area R1, the green area G1, the blue area B1, and the black shielding area Z1 are arranged in other proper ways in other embodiments.

Figure 8:
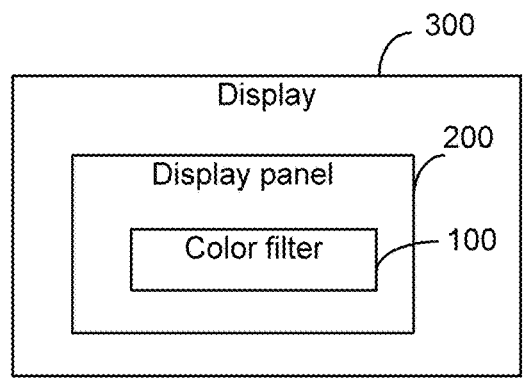
FIG. 8 shows a block diagram of a display according to a preferred embodiment of the present invention.

Please refer to FIG. 8 showing a schematic diagram of a display 300 according to the embodiment of the present invention. The display 300 comprises a display panel 200. The display panel 200 comprises the above-mentioned color filter 100. The display panel 200 can be a liquid crystal display (LCD) panel. It is possible that the display panel 200 further comprises other components such as a thin film transistor (TFT) array substrate, an indium tin oxide (ITO) electrode layer, etc. It is possible that the display 300 is an LCD.

Above are embodiments of the present invention, which does not limit the scope of the present invention. Any modifications, equivalent replacements or improvements within the spirit and principles of the embodiment described above should be covered by the protected scope of the invention.

What is claimed is:

1. A method of fabricating a color filter, comprising steps:
    forming a permeable film on a glass substrate and drying the permeable film; and
    pasting a black mask having a first hollow area on the dried permeable film, and putting the glass substrate having the black mask into a carbon black particle solution for forming the black shielding area and a marked area on the permeable film;
    removing the black mask, pasting a red mask having a second hollow area on the permeable film based on the marked area, and putting the glass substrate having the permeable film having the red mask into a red particle solution for forming a red area;
    removing the red mask, pasting a green mask having a third hollow area on the permeable film based on the marked area, and putting the glass substrate having the permeable film having the green mask into a green particle solution for forming a green area; and
    removing the green mask, pasting a blue mask having a fourth hollow area on the permeable film based on the marked area, and putting the glass substrate having the permeable film having the blue mask into a blue particle solution for forming a blue area, thereby forming the color filter comprising the red area, the green area, the blue area, and the black shielding area.

2. The method of claim 1, wherein the step of forming the permeable film on the glass substrate and drying the permeable film comprises:
    forming a macromolecular permeable film filled with a plurality of holes on the glass substrate by means of affix, and drying the permeable film.

3. The method of claim 1, wherein the step of forming the permeable film on the glass substrate and drying the permeable film comprises:
    coating a macromolecular osmotic material filled with a plurality of holes on the glass substrate, forming the permeable film on the glass substrate, and drying the permeable film.

4. The method of claim 1, wherein the marked area is a rectangular frame, and the red mask, the green mask, and the blue mask are pasted on the permeable film by aligning an edge of a frame of the marked area.

5. The method of claim 1, wherein the hollow area in the black mask is arranged in advance of the black shielding area and the marked area which need to be formed in the color filter; the hollow area in the red mask is arranged in advance of the red area which needs to be formed in the color filter; the hollow area in the green mask is arranged in advance of the green area which needs to be formed in the color filter; the hollow area in the blue mask is arranged in advance of the blue area which needs to be formed in the color filter.

* * * * *